United States Patent [19]

Ooenoki et al.

[11] Patent Number: 5,483,750
[45] Date of Patent: Jan. 16, 1996

[54] SPRINGBACK ANGLE MEASURING INSTRUMENT FOR V-BENDING

[75] Inventors: Toshiyuki Ooenoki; Toshiro Otani, both of Osaka, Japan

[73] Assignee: Kabushiki Kaisha Komatsu Seisakusho, Tokyo, Japan

[21] Appl. No.: 325,401

[22] Filed: Oct. 31, 1994

[30] Foreign Application Priority Data

Jun. 16, 1993 [JP] Japan .................................. 5-145059
Dec. 22, 1993 [JP] Japan .................................. 5-323849

[51] Int. Cl.⁶ .................................................. B21D 5/00
[52] U.S. Cl. ............................... 33/534; 72/389; 72/10
[58] Field of Search ........................... 33/1 N, 282, 285, 33/534; 72/21, 10, 26, 32, 34, 389

[56] References Cited

U.S. PATENT DOCUMENTS

| | | | |
|---|---|---|---|
| 4,564,765 | 1/1986 | Blaich | 72/389 |
| 4,802,357 | 2/1989 | Jones | 73/389 |
| 5,099,666 | 3/1992 | Sartorio et al. | 72/389 |
| 5,367,902 | 11/1994 | Kitabayashi et al. | 72/389 |
| 5,375,340 | 12/1994 | Gerritsen | 33/534 |

FOREIGN PATENT DOCUMENTS

| | | |
|---|---|---|
| 58-47599 | 3/1983 | Japan . |
| 61-229421 | 10/1986 | Japan . |
| 62-9721 | 1/1987 | Japan . |
| 62-22261 | 6/1987 | Japan . |
| 63-49327 | 3/1988 | Japan . |
| 63-52715 | 3/1988 | Japan . |
| 63-30123 | 8/1988 | Japan . |
| 2-49840 | 10/1990 | Japan . |
| 4-6452 | 2/1992 | Japan . |
| 4-145315 | 5/1992 | Japan . |
| PCT/WO92/05892 | 10/1991 | WIPO . |

*Primary Examiner*—William A. Cuchlinski, Jr.
*Assistant Examiner*—G. Bradley Bennett
*Attorney, Agent, or Firm*—Nikaido, Marmelstein, Murray & Oram

[57] ABSTRACT

A springback angle measuring instrument for V-bending designed to detect the springback angle of a workpiece in such a way: A bending angle $\theta_1$ of the workpiece is detected when an upper bender is lowered to an unloading starting position, and the instantaneous position of the upper bender and pressure imposed on the workpiece are detected while the upper bender being lifted at a very slow speed. The increment of the bending force per unit lifting distance of the upper bender is calculated and the bending angle of the workpiece at a point at which the increments of the bending force converge on a certain value is detected. Based on data on the bending angle and bending force obtained after this point, the relationship between the bending angle and the position of the upper bender and the relationship between the bending force and the position of the upper bender are respectively, approximated to a linear expression. The position of the upper bender where the bending force is zero is calculated from the linear approximate expression, and a bending angle $\theta_4$ of the workpiece for this position is estimated. The bending angle $\theta_1$ for the unloading starting position is subtracted from the bending angle $\theta_4$ to obtain the springback angle of the workpiece.

11 Claims, 15 Drawing Sheets

SPRINGBACK ANGLE MEASURING INSTRUMENT FOR V-BENDING

TECHNICAL FIELD

The present invention relates to a springback angle measuring instrument for V-bending, and more particularly, to a springback angle measuring instrument for measuring the springback angle of a workpiece which is held between upper and lower benders to be bent into a V-shape by pressing with these benders, in order to obtain the amount of elastic recovery of the workpiece.

BACKGROUND ART

In a known bending machine such as a press-brake in which a sheet-like workpiece is bent into a V-shape by pressing with the upper bender (punch) and the lower bender (die), the control amount of the upper bender or lower bender is adjusted by means of a numerical control (NC) system, in accordance with data such as the material and thickness of the workpiece and the conditions of the benders, so that an article having the desired bending angle can be produced.

It is difficult for such a bending machine to adjust the control amount of the bender with high accuracy because of factors such as variations in thickness and the characteristics of the material of the workpiece. In order to solve this problem, there has been proposed a bending machine in which the bending angle of a workpiece is measured by "in-line measurement" during the bending process and based on the measured value, the control amount of the bender is adjusted by feed back control, thereby achieving a higher bending accuracy. In this case, however, it is necessary to measure the springback (return due to elasticity) angle of the workpiece by "in-line measurement" as well, because the springback angle of the workpiece varies depending on the material and thickness of the workpiece, the conditions of the benders and other factors.

One example of the measurement of a springback angle is disclosed in Japanese Patent Publication Laid-Open No. 61-229421 (1986). According to this publication, the springback angle of a workpiece is measured in such a way: After a workpiece has been bent at a desired bending angle $\theta_A$ by bringing the upper and lower benders close to each other, the upper and lower benders are moved apart very slowly. At the time when the pressure imposed on the workpiece becomes zero, the bending angle $\theta_B$ of the workpiece is measured. Then, the springback angle $\Delta\theta_A$ of the workpiece bent at the angle $\theta_A$ is obtained by substituting the measurement result in the following equation.

$$\Delta\theta_A = \theta_B - \theta_A$$

It is generally known that as shown in FIG. 13, a linear relationship (correlation coefficient r=0.96) exists between the springback angle $\Delta\theta$ and the bending angle $\theta$ except for the initial stage of bending, that is, the region where the bending angle $\theta$ is greater than about 165°. Therefore, by repeatedly measuring, with the above-described method, the springback angle $\Delta\theta$ that varies continuously with changes in the bending angle $\theta$, the relationship between the bending angle $\theta$ and the springback angle $\Delta\theta$ can be easily obtained.

In order to measure the springback angle with the above-described method, it is necessary to release pressure imposed on the workpiece until the value of the imposed pressure becomes zero, in other words, until the upper bender (or lower bender) is moved apart from the workpiece. In actual bending, a bending position is usually located at the end portion of the workpiece 52 as shown in FIG. 14(a), so that the workpiece 52 rises from the lower bender 53 when moving apart the upper bender 51 from the workpiece 52 (see FIG. 14(b)), and the workpiece 52 slips to change the contact point with and the upper bender 51 (see FIG. 14(c)). If pressure is applied to the workpiece 52 again in such an unloaded condition, the relationship between the measured bending angle $\theta$ and the springback angle $\Delta\theta$ will change, resulting in a serious error in the control of the bender.

The invention has been made to overcome the above problems and therefore one of the objects of the invention is to provide a springback angle measuring instrument for V-bending which is capable of accurately detecting the springback angle of a workpiece at a stage where pressure imposed on the workpiece has not been completely released.

DISCLOSURE OF THE INVENTION

In accomplishing this and other objects, there is provided, according to the invention, a springback angle measuring instrument for V-bending in which the springback angle of a workpiece, which is held between upper and lower benders to be bent into a V-shape by pressing with these benders, is measured as the amount of elastic recovery of the workpiece, the measuring instrument comprising:

(a) bender position detecting means for detecting the position of either the upper bender or lower bender being lifted or lowered during bending of the workpiece;

(b) bending angle detecting means for detecting the bending angle of the workpiece during bending of the workpiece;

(c) pressure detecting means for detecting a pressure imposed on the workpiece during bending of the workpiece; and (d) arithmetic and storage means for (i) storing a first bending angle of the workpiece, said first bending angle being detected by the bending angle detecting means when said bender is at an arbitrary position, (ii) obtaining the increment of the imposed pressure per unit lifting/lowering distance of said bender, based on the position of said bender and the value of the imposed pressure detected by the bender position detecting means and the pressure detecting means, respectively, while said bender is being lifted or lowered to reduce the pressure imposed on the workpiece within such a range that the pressure does not become zero, (iii) calculating the position of said bender at which the imposed pressure is zero from a linear approximate expression of at least two bending angles and two pressure values detected by the bending angle detecting means and the pressure detecting means, respectively, at the corresponding bender positions where said increment is kept to be a certain value, (iv) estimating a second bending angle of the workpiece for the calculated bender position, and (v) subtracting the first bending angle from the second bending angle to obtain the springback angle of the workpiece.

In the above springback angle measuring instrument, the springback angle of a workpiece is measured in such a way: A first bending angle of the workpiece when the lifted or lowered bender is located at an arbitrary position (unloading starting position) is measured and stored. Then, the bender is lifted or lowered for reducing the pressure imposed on the workpiece within such a range that the imposed pressure does not become zero. The position of the bender and the imposed pressure, which vary as the bender is lifted or lowered, are detected at intervals of time. Based on detected values, the increment of the imposed pressure per unit lifting/lowering distance of the bender is obtained. Then, the position of the bender when the imposed pressure is zero (i.e., unloading completing position) is calculated from a linear approximate expression of bending angle and imposed pressure detected at two positions of the bender where the increment is maintained to be a certain value. A second bending angle of the workpiece for the above calculated position is estimated and the first bending angle is subtracted from the second bending angle, thereby obtaining the springback angle of the workpiece. Thus, the springback angle of the workpiece can be detected at the stage where the pressure applied to the workpiece has not been completely released so that the contact point between the workpiece and the bender is not shifted. With such a measuring instrument, accurate springback angle detection can be achieved and as a result, the accuracy of the bending process can be highly improved.

The bender position detecting means may be a position sensor attached to a bender driving section for lifting or lowering the bender or a displacement sensor embedded in the bender.

According to the second aspect of the invention, there is provided a springback angle measuring instrument for V-bending, comprising:

(a) bending angle detecting means for detecting the bending angle of a workpiece during bending of the workpiece;

(b) pressure detecting means for detecting a pressure imposed on the workpiece during bending of the workpiece; and (c) arithmetic and storage means for (i) storing a first bending angle of the workpiece and a first pressure, said first bending angle and said first pressure being detected by the bending angle detecting means and the pressure detecting means, respectively, when either an upper bender or lower bender is at an arbitrary position, (ii) storing a second bending angle of the workpiece, said second bending angle being detected by the bending angle detecting means when a second pressure is detected by the pressure detecting means as said bender is lifted or lowered to reduce the pressure imposed on the workpiece, the ratio of the second pressure to the first pressure being specified, (iii) storing a third bending angle of the workpiece and a third pressure, said third bending angle and said third pressure being detected by the bending angle detecting means and the pressure detecting means, respectively, at a position where the pressure imposed on the workpiece has a specified small value during lifting or lowering of said bender for reducing the imposed pressure to the specified small value, (iv) estimating a forth bending angle when the imposed pressure is zero from a linear approximate expression of the second and third bending angles and the second and third pressures, and (v) subtracting the first bending angle from the forth bending angle to obtain the springback angle of the workpiece.

In the above springback angle measuring instrument, the springback angle of a workpiece is measured in such a way: A first bending angle of the workpiece and a first pressure when the lifted or lowered bender is located at an arbitrary position (unloading starting position) are detected and stored. Then, the bender is lifted or lowered to reduce the pressure imposed on the workpiece and during the lifting or lowering of the bender, a second pressure which is at a specified ratio with respect to the first pressure is detected. A second bending angle corresponding to the second pressure is detected and stored. Then, the bender is further lifted or lowered until the pressure imposed on the workpiece has a specified small value. A third bending angle and a third pressure when the bender is at the position where the imposed pressure has a specified small value are detected and stored. From a linear approximate expression of the second and third bending angles and the second and third pressures, a forth bending angle of the workpiece when the imposed pressure is zero is estimated. Then, the first bending angle is subtracted from the forth bending angle, thereby obtaining the springback angle of the workpiece. Thus, the springback angle of the workpiece can be accurately detected without measuring the relative displacement of the upper and lower benders.

The estimation of the forth bending angle may be based on a linear approximate expression of three or more sampled data pieces on the bending angle and imposed pressure. This increases the measuring accuracy. The second pressure is preferably half of the first pressure. This allows a linear relationship between the imposed pressure and the bending angle, when the imposed pressure is not more than the second pressure.

According to the third aspect of the invention, there is provided a springback angle measuring instrument for V-bending, comprising:

(a) bending angle detecting means for detecting the bending angle of a workpiece during bending of the workpiece;

(b) pressure detecting means for detecting a pressure imposed on the workpiece, during bending of the workpiece; and (c) arithmetic and storage means for (i) storing a first bending angle of the workpiece and a first pressure, said first bending angle and said first pressure being detected by the bending angle detecting means and the pressure detecting means, respectively, when either an upper bender or lower bender is at an arbitrary position, (ii) obtaining the increment of the bending angle per unit amount of change in the imposed pressure, based on the bending angle of the workpiece and the imposed pressure which vary and are detected by the bending angle detecting means and the pressure detecting means, respectively, while said bender is being lifted or lowered to reduce the pressure imposed on the workpiece within such a range that the pressure does not become zero, (iii) estimating a second bending angle of the workpiece when the imposed pressure is zero from a linear approximate expression of at least two bending angles and two pressure values detected by the bending angle detecting means and the pressure detecting means, respectively, when the increment is kept to be a certain value, and (iv) subtracting the first bending angle from the second bending angle to obtain the springback angle of the workpiece.

In the above springback angle measuring instrument, the springback angle of a workpiece is measured in such a way: A first bending angle of the workpiece and a first pressure when the lifted or lowered bender is at an arbitrary position (unloading starting position) are detected and stored. Then, the bender is lifted or lowered such that the pressure imposed on the workpiece is reduced within such a range that the imposed pressure does not become zero. During the lifting or lowering of the bender, the bending angle of the workpiece and imposed pressure are detected. Based on detected values, the increment of the bending angle per unit amount of change in the imposed pressure is calculated. From a linear approximate expression of at least two bending angles and two pressure values which are detected when the increment is maintained to be a certain value, a second bending angle when the imposed pressure is zero is estimated. The first bending angle is subtracted from the second bending angle, thereby obtaining the springback angle of the workpiece. Accordingly, the springback of the workpiece can be accurately detected without accurately measuring the relative displacement of the upper and lower benders.

In each embodiment of the springback angle measuring instrument, the bending angle detecting means is preferably designed such that a slit light or a plurality of spot lights projected onto the surface of a workpiece are photographed and the bending angle of the workpiece is detected by processing the photographed image. The pressure detecting means is preferably a load sensor which is attached to the bender driving section for lifting or lowering the bender.

The springback angle measuring instrument for V-bending of the invention is applicable to a bending machine of the over-drive type in which the lower bender is fixed while the upper bender is actuated. The measuring instrument is also applicable to a bending machine of the under-drive type in which the upper bender is fixed while the lower bender is actuated.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1 to 4 provide illustrations of a first embodiment of a springback angle measuring instrument according to the invention;

FIG. 1 is a system structure diagram;

FIG. 3 is a flow chart of arithmetic operation for obtaining a springback angle;

FIG. 4 is graphs associated with the arithmetic operation for obtaining a springback angle;

FIGS. 5 to 10 provides illustrations of a second embodiment of the springback angle measuring instrument of the invention;

FIG. 5 is a system structure diagram;

FIG. 6 is a graph associated with arithmetic operation for obtaining a springback angle;

FIG. 7 is a flow chart of the arithmetic operation for obtaining a springback angle;

FIG. 9 illustrates one example of a method for calculating a point $F_3$;

FIG. 10 is a graph showing the comparison results of springback angles;

FIG. 11 is a graph associated with arithmetic operation for obtaining a springback angle;

FIG. 12 is a flow chart of the arithmetic operation for obtaining a springback angle;

FIG. 13 is a graph showing bending angle versus springback angle; and

FIGS. 14(a–14c) show the disadvantage of a prior art springback angle measuring method.

BEST MODE FOR CARRYING OUT THE INVENTION

With reference to the drawings, preferred embodiments of a springback angle measuring instrument for V-bending according to the invention will be hereinafter described.

First Embodiment

Figure 1:
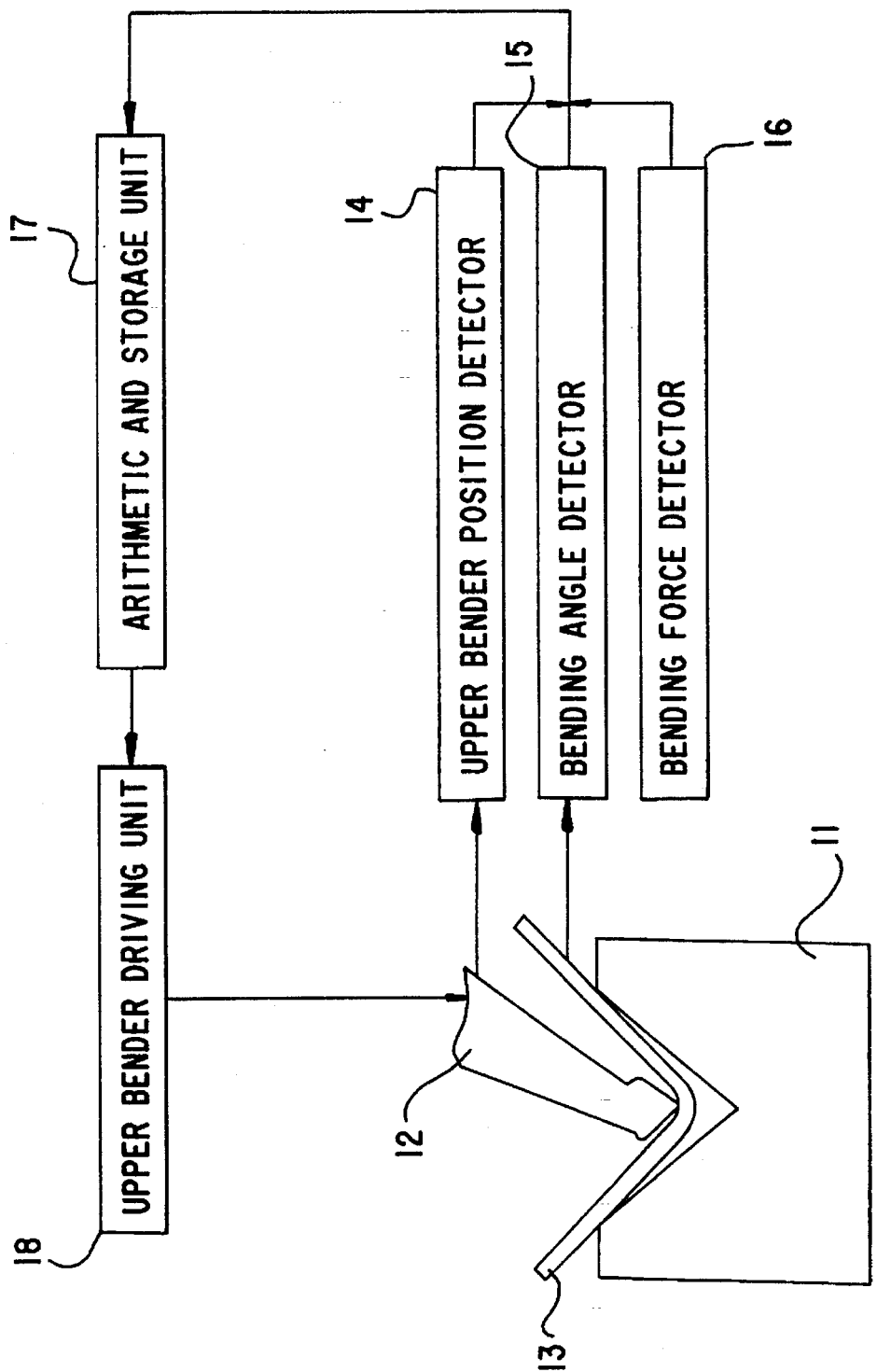

Referring to FIG. 1, there is shown the system structure of a press brake according to a first embodiment. In this press brake, a lower bender 11 is attached to a horizontally fixed table, while an upper bender 12 is attached to the underside of a ram which can be lifted or lowered in relation to the lower bender 11. The upper bender 12 is lowered towards a sheet-like workpiece 13 placed on the lower bender 11, thereby carrying out bending of the workpiece 13. The position of the upper bender 12 which is being lifted and lowered is detected by an upper bender position detector 14 and the bending angle of the workpiece 13 is detected by a bending angle detector 15. Pressure (bending force) applied to the workpiece 13 is detected by a bending force detector 16. Detection signals released from the upper bender position detector 14, the bending angle detector 15 and the bending force detector 16 are input to an arithmetic and storage unit 17 where arithmetic operation is executed according to a specified program upon receipt of the input information. The arithmetic and storage unit 17, then, releases a signal for lifting or lowering the upper bender 12 to an upper bender driving unit (ram) 18.

With reference to FIG. 2, position control for the upper bender 12 and arithmetic operation for obtaining a springback angle will be described according to the first embodiment.

Figure 2A:
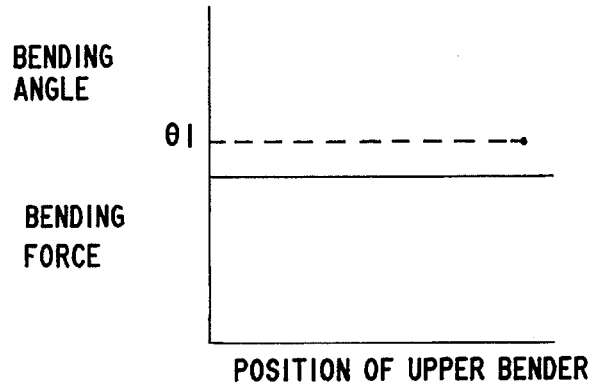
FIGS. 2(a)–2(e) are graphs showing the bending angle of a workpiece versus the position of an upper bender and bending force versus the position of the upper bender.
Figure 2D:
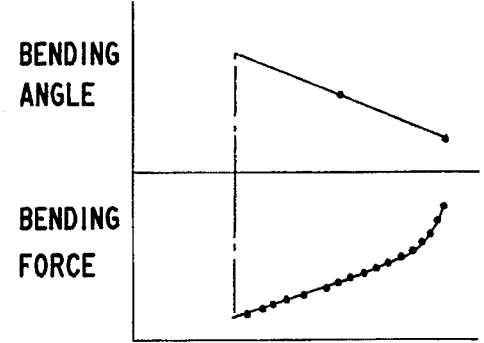
Figure 2B:
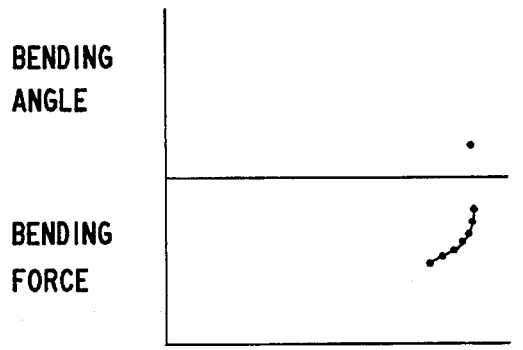
Figure 2E:
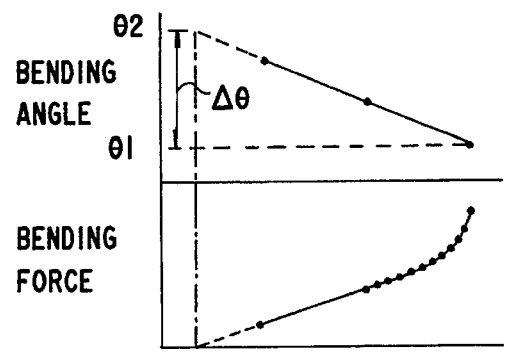

First, the upper bender 12 is lowered to an arbitrary position (unloading starting position) to bend the workpiece 13 and the bending angle $\theta_1$ of the workpiece 13 at the unloading starting position is detected by the bending angle detector 15 (see FIG. 2(a)). Then, the upper bender 12 is lifted at a very slow speed. During the lifting of the upper bender 12, a sequence of values of the position of the upper bender 12 and the pressure imposed on the workpiece 13 are detected by the upper bender position detector 14 and the bending force detector 16, respectively, (see FIG. 2(b)), thereby sampling data. From sampled data thus obtained, the increment of the bending force per unit lifting distance of the upper bender 12 is calculated by the arithmetic and storage unit 17. Since a general purpose measuring instrument capable of high-speed response can be readily adopted as the upper bender position detector 14 and the bending force detector 16, data sampling can be performed at high speed.

Figure 2C:
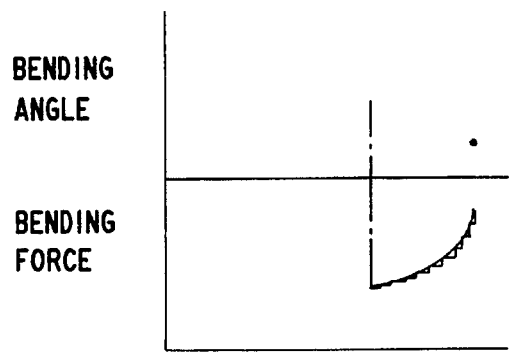

Then, the bending angle of the workpiece 13 is detected by the bending angle detector 15 at a point where the increments of the bending force converge upon a certain value (second-order differential value=0) (see FIG. 2(c)).

Thereafter, the upper bender 12 is further lifted from the above point at a very slow speed until a preset bending force by which the workpiece 13 can be held is obtained (the value of the preset bending force is sufficiently small, but larger than 0). During the lifting of the upper bender 12, a sequence of values of the position of the upper bender 12 and the pressure imposed on the workpiece 13 are detected by the upper bender position detector 14 and the bending force detector 16, respectively. At the point the bending force reaches a preset value, the bending angle of the workpiece 13 is again detected by the bending angle detector 15 (see FIG. 2(d)).

Based on data on the bending angle and the bending force sampled after the point where the increments of the bending force converge upon a certain value, the relationship between the bending angle and the position of the upper bender 12 and the relationship between the bending force and the position of the upper bender 12 are approximated to linear expressions. Using these linear approximate expressions, the position of the upper bender 12 where the bending force is zero is calculated and the bending angle $\theta_2$ of the workpiece 13 for this position is estimated. The difference ($\theta_2-\theta_1$) between the bending angle $\theta_2$ thus obtained and the bending angle $\theta_1$ obtained at the unloading starting position is determined as a springback angle $\Delta\theta$ (see FIG. 2(e)).

Figure 3A:
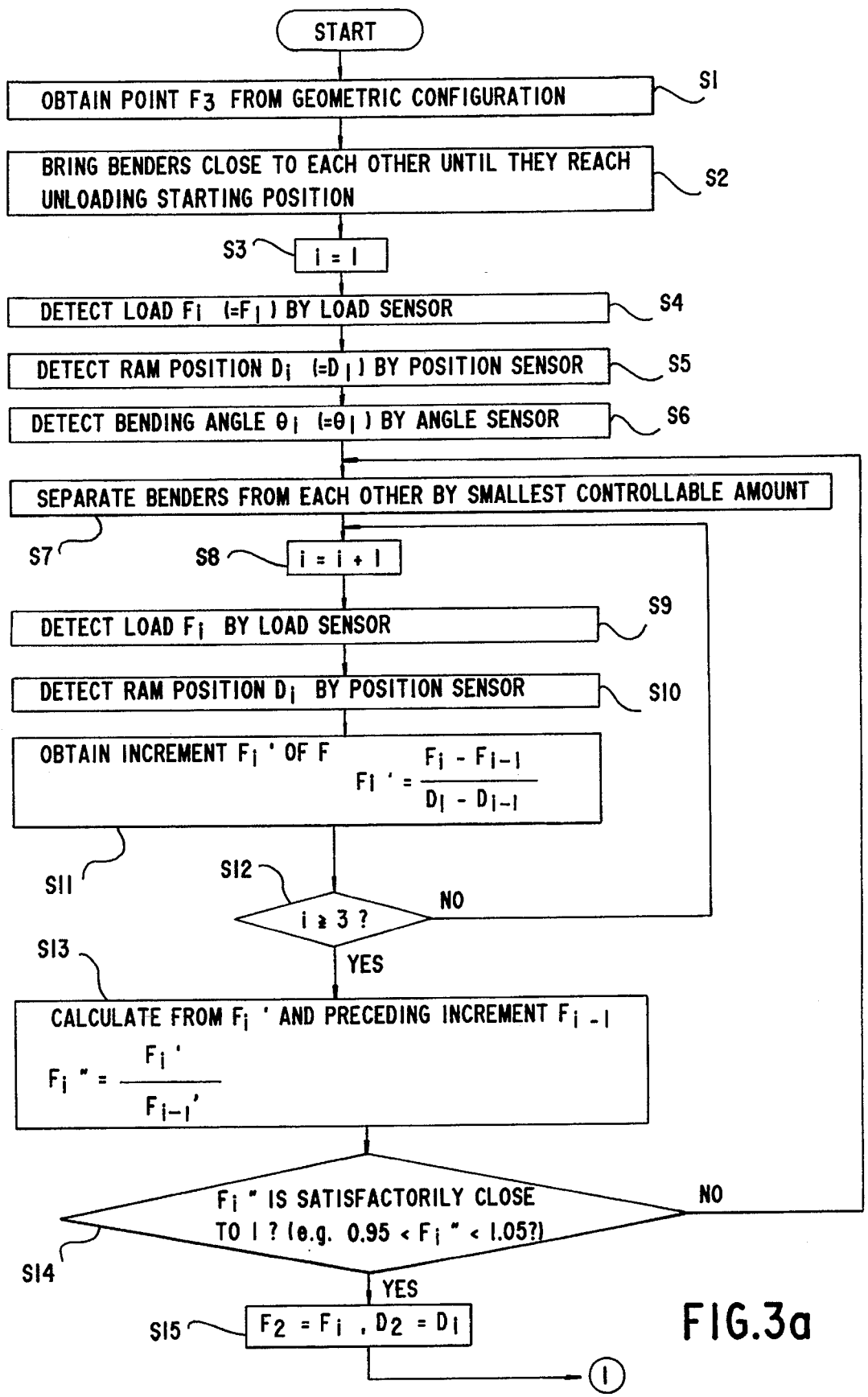
Figures 3, 3B:
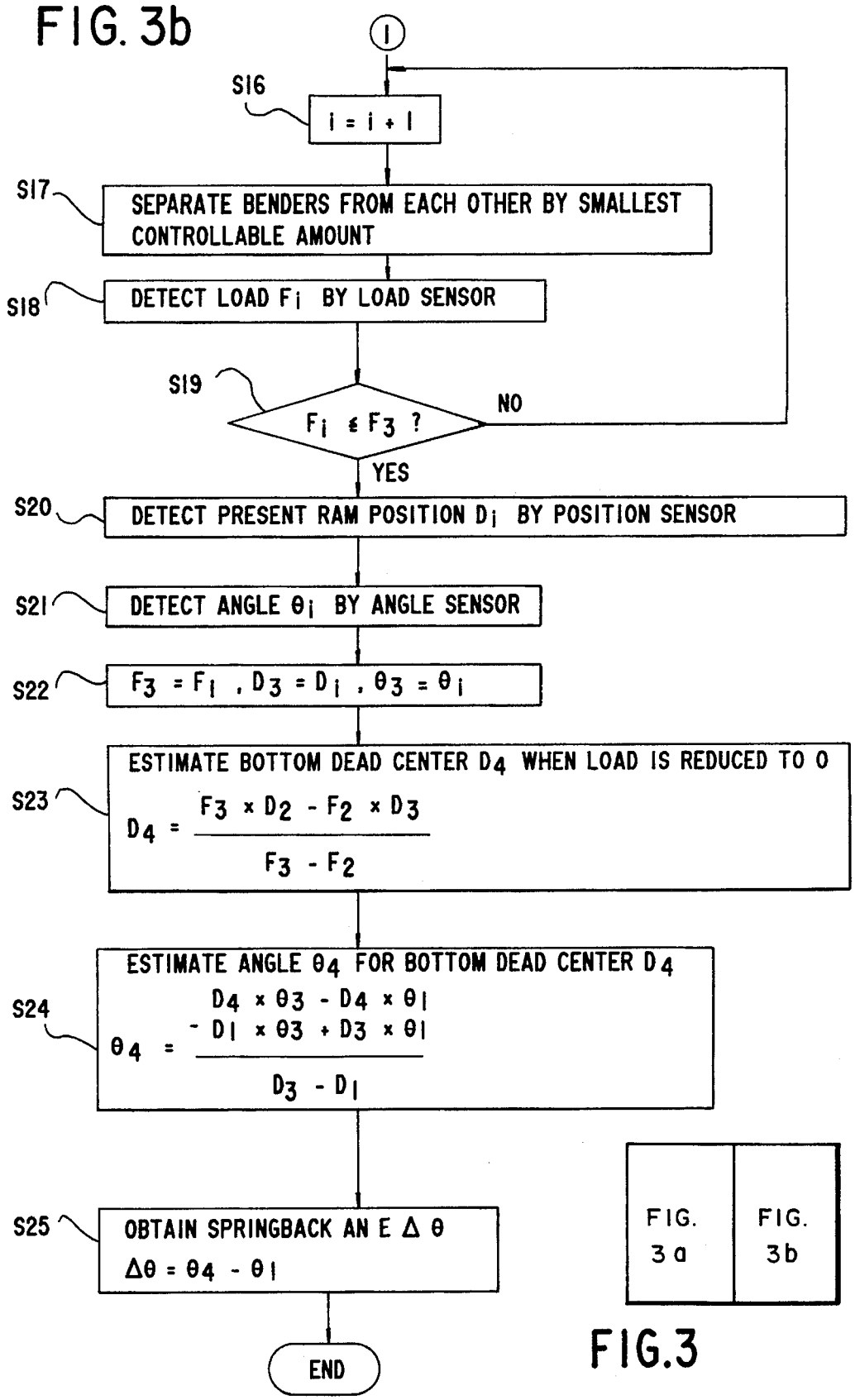
Figure 4:
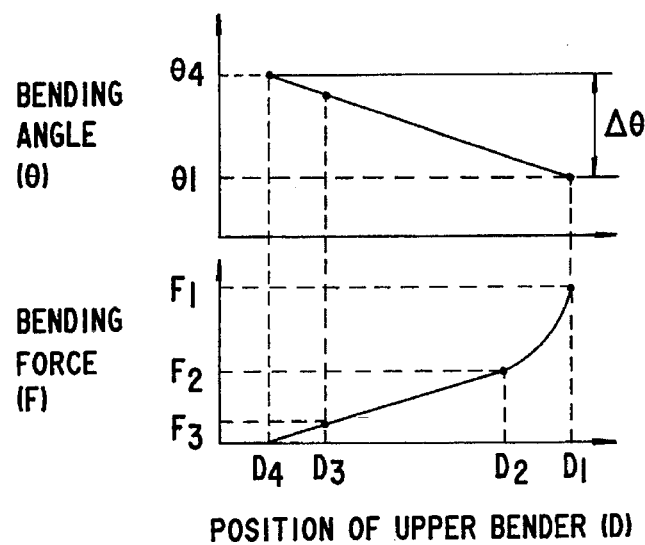

FIG. 3 shows a flow chart of the above-described arithmetic operation for obtaining a springback angle. This flow chart will be described in conjunction with FIG. 4.

S1 to S6: From the size and thickness of the workpiece 13 and the geometric configuration of the lower bender 11 (the size of the V-portion etc.), a point $F_3$ (set bending force) is obtained by arithmetic operation, and the lower bender 11 and the upper bender 12 are brought close to each other until they reach the unloading starting position. Then, an ordinal number i which indicates the number of sampled data pieces is set to 1, and a load (i.e., pressure) $F_i(=F_1)$ is detected at the loading starting position by the load sensor (i.e., bending force detector 16). Also, the position of the ram $D_i(=D_1)$ and the bending angle $\theta_i(=\theta_1)$ are detected by the position sensor (i.e., upper bender position detector 14) and the angle sensor (i.e., bending angle detector 15), respectively.

S7 to S11: The lower bender 11 and the upper bender 12 are moved apart from each other by the smallest controllable amount. Then, the ordinal number i is incremented by 1, and the load $F_i$ and the ram position $D_i$ are detected by the load sensor and the position sensor, respectively. The increment $F_i'$ of the load F per unit lifting distance of the upper bender 12 is calculated from the following equation.

$$F_i'=(F_i-F_{i-1})/(D_i-D_{i-1})$$

S12 to S15: If the ordinal number i is less than 3(i<3), the program returns to S8 to increment the ordinal number i and the flow for obtaining the increment $F_i'$ is repeated. If the ordinal number is 3 or more (i≧3), the ratio $F_i''$ of the present increment $F_i'$ to the preceding increment $F_{i-1}'(=F_i'/F_{i-1}')$ is obtained. Judgment as to whether the ratio $F_i''$ thus obtained is sufficiently close to 1, that is, whether the increment $F_i'$ converges upon a certain value is made by judging whether $0.95<F_i''<1.05$ is satisfied. If the increment $F_i'$ converges on a certain value, $F_2$ is set equal to $F_i$ and $D_2$ to $D_1$, respectively. On the other hand, if the increment $F_i'$ does not converge on a certain value, the processes after S7 onwards are repeated.

S16 to S18: The ordinal number i is incremented by 1 and the lower bender 11 and the upper bender 12 are moved apart from each other by the smallest controllable amount. Then, the load $F_i$ is detected by the load sensor.

S19 to S25: If the detected load $F_i$ is more than $F_3(F_i>F_3)$, the program returns to S16. If the load $F_i$ is not more than $F_3(F_i\leq F_3)$, the ram position $D_i$ and the bending angle $\theta_i$ are detected by the position sensor and the angle sensor, respectively, and $F_3$ is set equal to $F_i$, $D_3$ to $D_i$ and $\theta_3$ to $\theta_i$, respectively.

A point $(D_2, F_2)$ and point $(D_3, F_3)$ on the curve which represents the position of the upper bender 12 (D) versus bending force (F) are expressed by a linear approximate expression. The position (bottom dead center) $D_4$ of the upper bender 12 when load is reduced to zero is estimated by the following equation.

$$D_4=(F_3\times D_2-F_2\times D_3)/(F_3-F_2)$$

Then, the bending angle $\theta_4$ which corresponds to the position $D_4$ of the upper bender 12 thus obtained is estimated by the following equation.

$$\theta_4=(D_4\times\theta_3-D_4\times\theta_1-D_1\times\theta_3+D_3\times\theta_1)/(D_3-D_1)$$

The springback angle $\Delta\theta$ is obtained from the following equation.

$$\Delta\theta=\theta_4-\theta_1$$

In the first embodiment, the position of the upper bender when the bending force is zero is calculated in accordance with the data on the position of the upper bender and bending force detected at two points where the increment of the bending force imposed on the workpiece during unloading is maintained to be a certain value. However, sampled data may be obtained from three points or more and in this case, the detection accuracy can be even more increased. Also, the number of sampled data pieces may be increased for detecting the bending angle as well.

In the first embodiment, the springback angle of the workpiece is estimated from the imposed pressure and the position of the upper bender when unloading is carried out. However, it is desired to detect not only the position of the upper bender but also the relative displacement of the upper and lower benders, in order to eliminate the adverse effects of backlash and the distortion of the benders and the press. For detecting the relative displacement of the benders, for example, a displacement sensor embedded in the bender may be employed.

The upper bender position detector 14 in the first embodiment may be a position sensor attached to the ram driving section for lifting or lowering the upper bender 12 or may be a displacement sensor embedded in the lower bender 11.

Second Embodiment

This embodiment provides a measuring instrument capable of measuring a springback angle without detecting the position of a bender.

Figure 5:
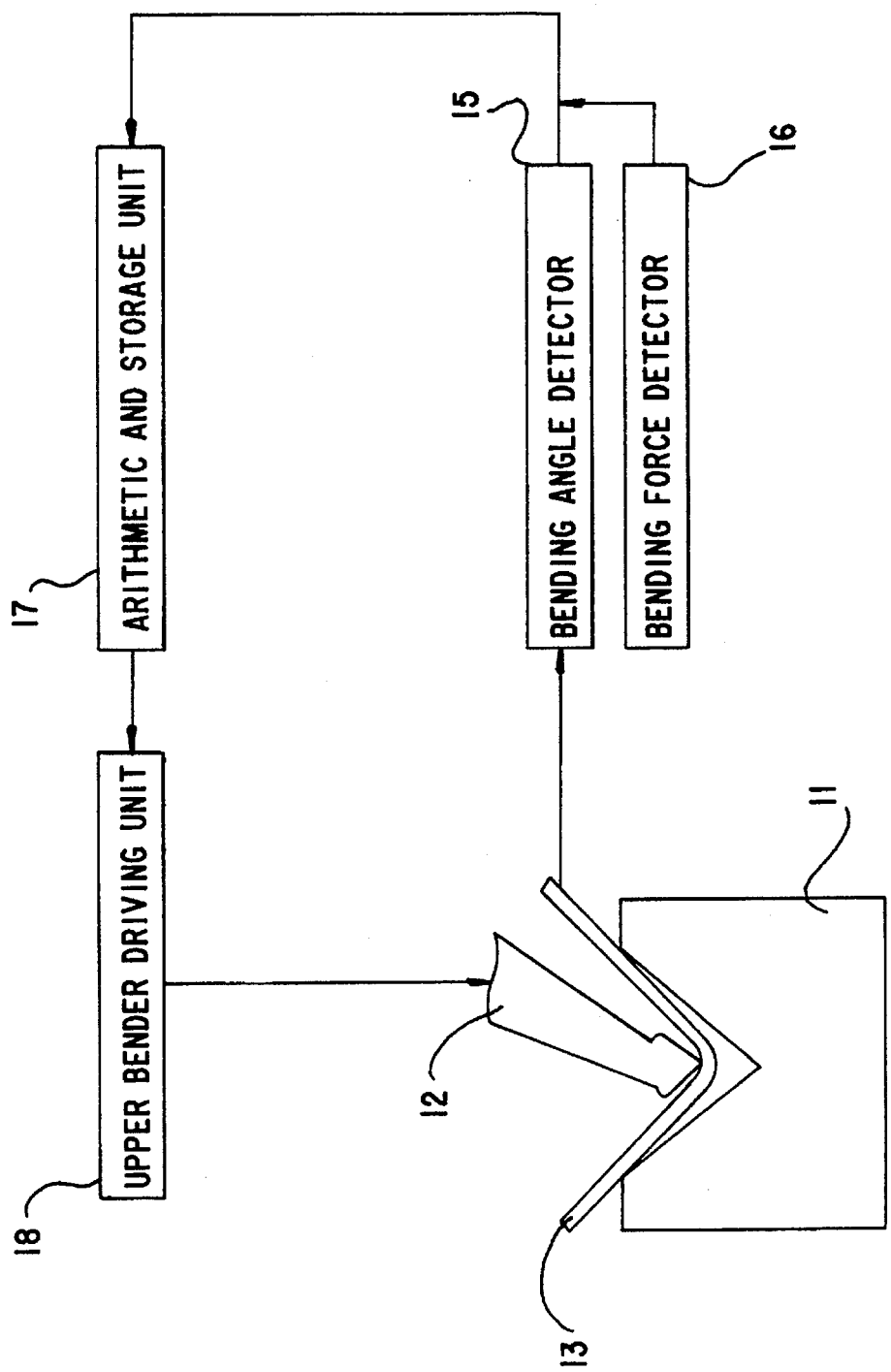

Reference is first made to FIG. 5 which shows a system structure. In the press brake of the second embodiment, an upper bender 12 is lowered to a sheet-like workpiece 13 placed on a lower bender 11 like the first embodiment, whereby bending of the workpiece 13 is performed. The press brake of this embodiment does not need the upper bender position detector 14 described in the first embodiment. Detection signals generated by a bending angle detector 15 for detecting the bending angle of the workpiece 13 and a bending force detector 16 for detecting a pressure (bending force) imposed on the workpiece 13 are input to an arithmetic and storage unit 17 where arithmetic operation is executed according to a specified program upon receipt of the input information. Then, the arithmetic and storage unit 17 releases a signal for lifting or lowering the upper bender 12 to an upper bender driving unit (ram) 18.

Figure 6:
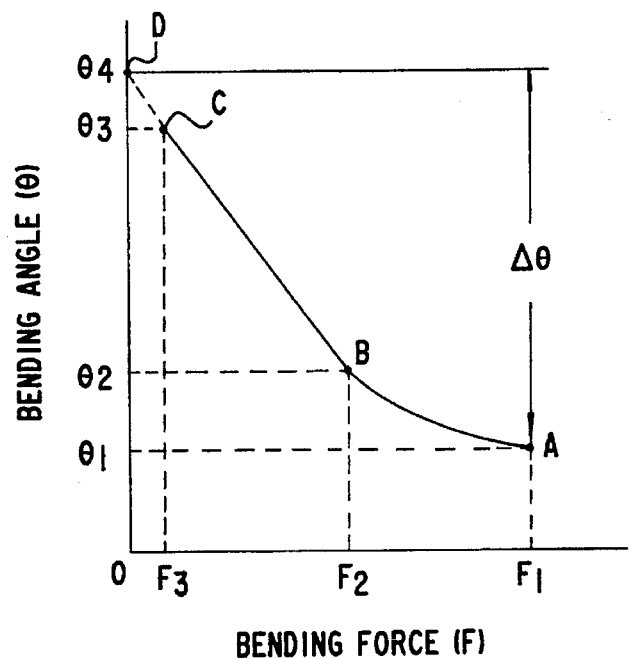

With reference to FIG. 6, positional control for the upper bender 12 and arithmetic operation for obtaining a springback angle will be described according to the second embodiment.

First, the upper bender 12 is lowered to an unloading starting position A to bend the workpiece 13. At the unloading starting position A, the bending angle $\theta_1$ of the workpiece 13 is detected by the bending angle detector 15 and an imposed pressure (bending force) $F_1$ is detected by the bending force detector 16. Then, the upper bender 12 is lifted at a very slow speed, and a bending angle $\theta_2$ is detected at a point B where the bending force is at a specified ratio (e.g., 0.5) with respect to the bending force $F_1$ for the unloading starting position A. The bending force at the point B is set to $F_2(=0.5 \times F_1)$.

The upper bender 12 is further lifted from the point B at a very slow speed until it reaches a point C where a preset bending force $F_3$ by which the workpiece 13 can be held is obtained (the bending force $F_3$ is sufficiently small but greater than 0). At the point C, a bending angle $\theta_3$ is detected. Note that a bending force $F_3$ can be easily calculated, for example, from the size and thickness of the workpiece 13 and the size of the V-portion of the lower bender 11 and the like.

The relationship between the bending force F and the bending angle $\theta$ based on the sampled data obtained from the range between two points B and C is expressed as a linear expression. From the linear expression, a bending angle $\theta_4$ at a point D where the bending force F=0 can be calculated. The difference $(\theta_4-\theta_1)$ between the bending angle $\theta_4$ thus obtained and the bending angle $\theta_1$ at the unloading starting position A is determined as the springback angle $\Delta\theta$.

Figures 7, 7A:
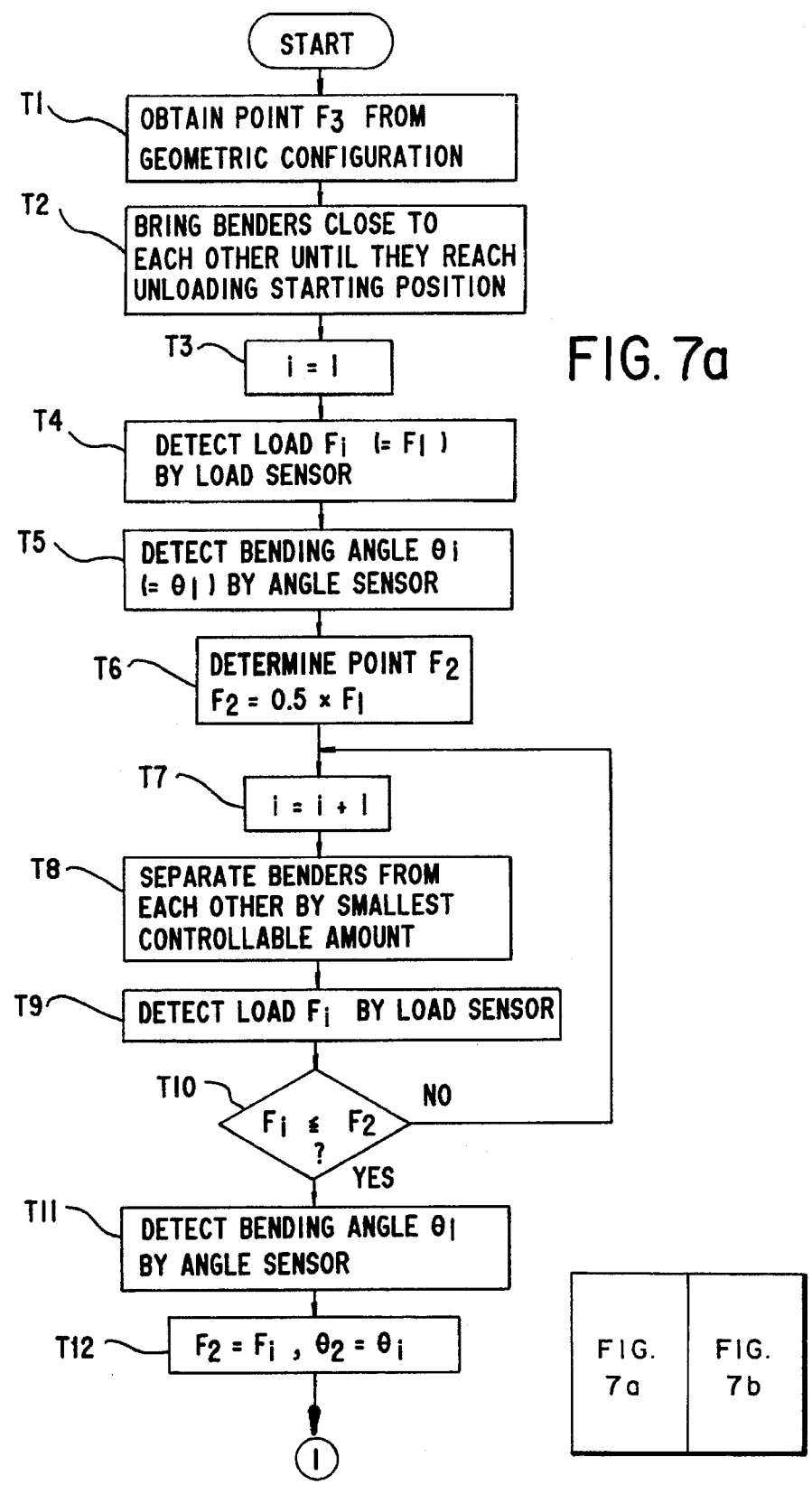
Figure 7B:
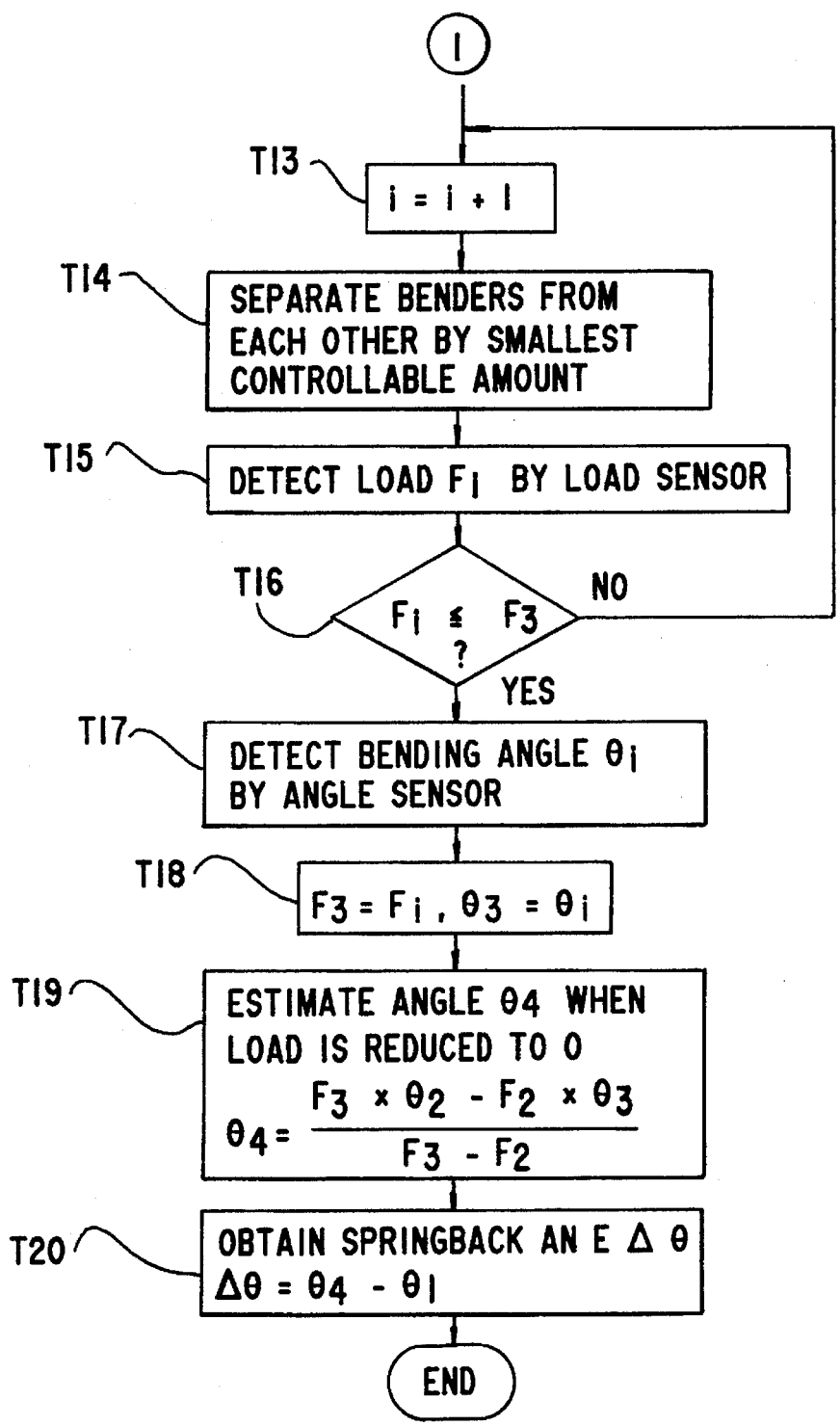
Figure 8A:
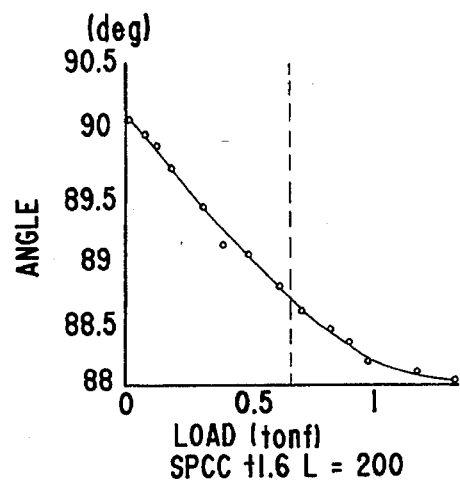
FIGS. 8(a)–8(g) are graphs showing load versus bending angle at the time of unloading.
Figure 8B:
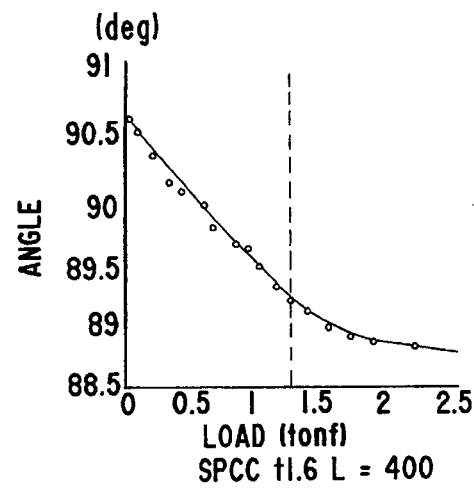
Figure 8C:
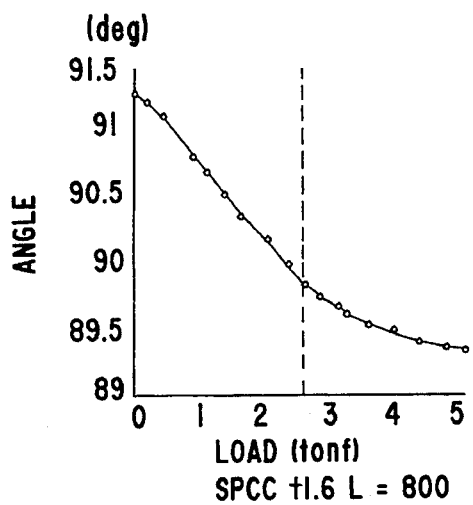
Figure 8D:
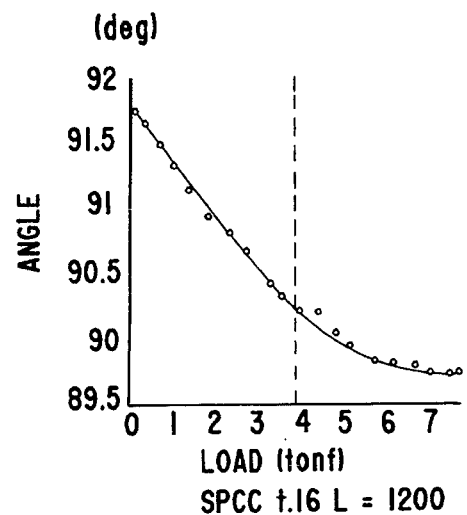
Figure 8E:
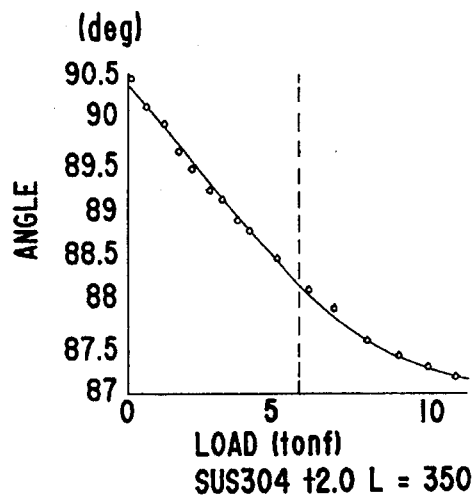
Figure 8F:
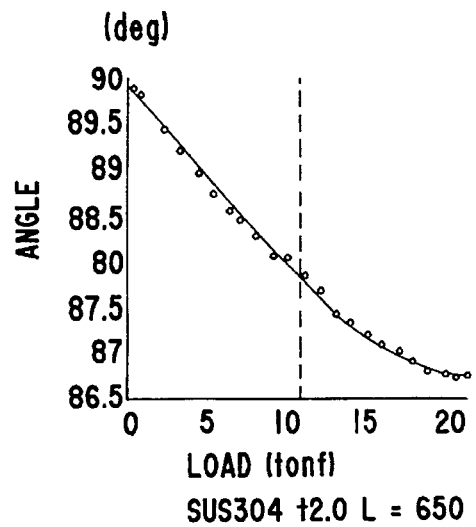
Figure 8G:
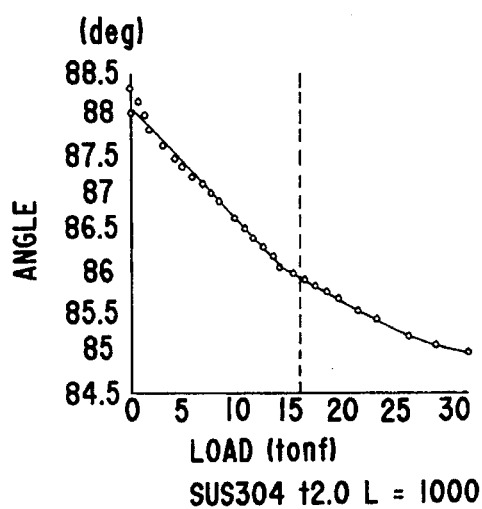

FIG. 7 shows the flow chart of the arithmetic operation for obtaining a springback angle according to the second embodiment. This flow chart will be described below.

T1 to T5: From the size and thickness of the workpiece 13 and the geometric configuration of the lower bender 11 (the size of the V-portion etc.), the point $F_3$ (set bending force) is obtained by arithmetic operation, and the lower bender 11 and the upper bender 12 are brought close to each other until they reach the unloading starting position. Then, an ordinal number i which indicates the number of sampled data pieces is set to 1. At the unloading starting position, the load (i.e., pressure) $F_i(=F_1)$ is detected by the load sensor (i.e., bending force detector 16) and the bending angle $\theta_i(=\theta_1)$ is detected by the angle sensor (i.e., bending angle detector 15).

T6 to T9: The load value $F_2$ which is at a specified ratio $(0.5 \times F_1)$ with respect to the load $F_1$ for the unloading starting position is determined. Then, the ordinal number i is incremented by 1. The lower bender 11 and the upper bender 12 are moved apart from each other by the smallest controllable amount and the load $F_i$ is detected by the load sensor.

T10 to T12: If the detected load $F_i$ is more than $F_2(F_i>F_2)$, the program returns to T7. If $F_i$ is not more than $F_2(F_i \leq F_2)$, the bending angle $\theta_i$ is detected by the angle sensor and $F_2$ is set equal to $F_i$ and $\theta_2$ to $\theta_i$.

T13 to T15: The ordinal number i is incremented by 1. The lower bender 11 and the upper bender 12 are moved apart from each other by the smallest controllable amount and the load $F_i$ is detected by the load sensor.

T16 to T20: If the detected load $F_i$ is more than $F_3(F_i>F_3)$, the program returns to T13. If the load $F_i$ is not more than $F_3(F_i \leq F_3)$, the bending angle $\theta_i$ is detected by the angle sensor and $F_3=F_i$, $\theta_3=\theta_i$.

Thereafter, the bending angle $\theta_4$ when the load is reduced to zero is estimated by the following equation.

$$\theta_4=(F_3 \times \theta_2 - F \times \theta_3)/(F_3-F_2)$$

The springback angle $\Delta\theta$ is lastly calculated from the following equation.

$$\Delta=\theta_4-\theta_1$$

Workpieces of different materials (SPCC or SUS304) having different thicknesses (t1.6 or t2.0) and different lengths (L=200 to 1,200) were bent at about 90° into a V-shape and the relationship between the load (F) and the bending angle ($\theta$) at the time of unloading was checked in each case. FIGS. 8(a) to 8(g) show the result of each case. In these figures, each broken line indicates the position where the load is half of the load detected at the unloading starting position. It is understood from the test result that, by setting the point $F_2$ to half of the load $(F_1)$ for the unloading starting position, the relationship between the load (F) and the bending angle ($\theta$) in the region where the load is smaller than $F_2$ (i.e., the region on the right side of the broken line) can be approximated to a straight line. The correlation coefficient of the load (F) and the bending angle ($\theta$) in this region has proved to be 0.99 or more.

Figure 9:
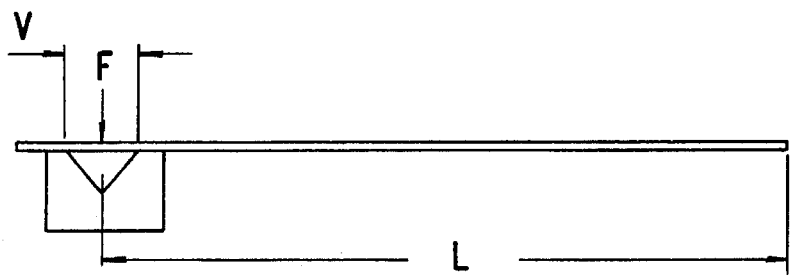

The value of $F_3$ is set in the following way, based on the moment (the maximum moment) when the workpiece has not been bent yet. As shown in FIG. 9, where the longer leg of the workpiece after bending is L and the width of the V-groove of the lower bender is V, the following equation holds because of the balance of moment per unit bending length (bending length is normal to the surface of the drawing). Note that the weight of the workpiece on the left of the fulcrum is ignored.

$$F \times (\tfrac{1}{2})V = (\tfrac{1}{2}V)^2 \times t \times \rho$$

where F is load, t is the thickness of a workpiece and $\rho$ is specific gravity.

The value of F obtained by the above equation is substituted in the following equation. Then, $F_3$ obtained by the following equation is compared with the smallest controllable load (pressure) determined in the main control unit and the greater value is used as $F_3$.

$$F_3 = \kappa \times F \times W$$

where W is bending length and $\kappa$ is a coefficient greater than 1.

For example, when a soft steel plate having a width of 1,000 mm and thickness of 3.2 mm is bent with a lower bender having a 25 mm-width V portion and 900 mm-long leg, the value of F is as follows.

$$\begin{aligned} F &= 0.5 \times (900-12.5)^2 \times 3.2 \times (7.85 \times 10^{-6})/12.5 \\ &= 0.791 \end{aligned}$$

If $\kappa=1.2$, the value of $F_3$ is as follows.

$$\begin{aligned} F_3 &= 1.2 \times 0.791 \times 1,000 = 950 \text{ kgf} \\ &\approx 1 \text{ tonf} \end{aligned}$$

Figure 10:
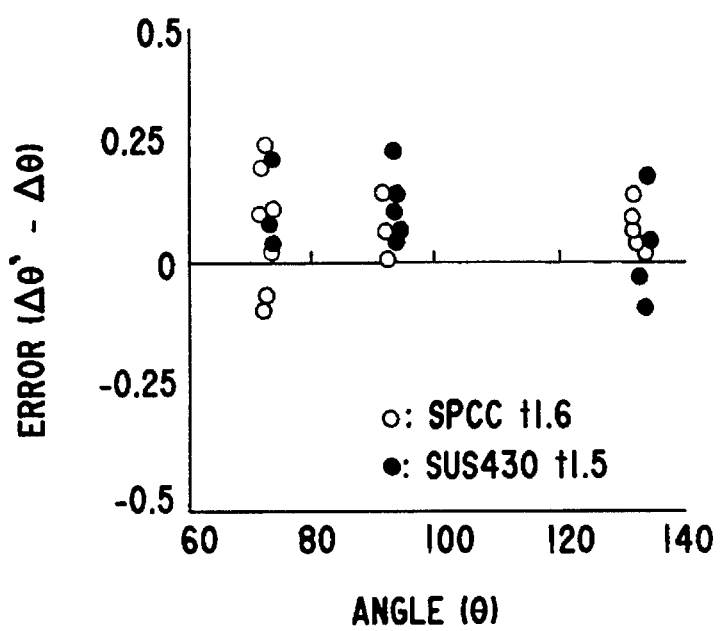

FIG. 10 shows the result of a test for comparing springback angles obtained through the arithmetic operation of the second embodiment and actual springback angles. This test is conducted under the conditions that $F_2=0.5 \times F_1$ and $F_3=200$ kgf and each springback angle is obtained from two sampled data pieces. In FIG. 10, the abscissa represents a bending angle at the unloading starting position whereas the ordinate represents the difference $(\Delta\theta'-\Delta\theta)$ between an estimated springback angle $(\Delta\theta')$ and an actual springback angle $(\Delta\theta)$. White circle marks represent SPCC (t1.6) and black circle marks SUS 430 (t1.5). It is obvious from the test result that the springback angle of a workpiece can be accurately estimated by the arithmetic operation of the second embodiment.

Like the first embodiment, sampled data may be obtained from three or more points, when estimating a linear part. This increases the detection accuracy even more.

Third Embodiment

In the second embodiment, the relationship between the load (F) and the bending angle (θ) is linear in the region where the ratio of the load to the load for the unloading starting position is lower than a specified ratio (i.e., 0.5). According to the third embodiment, the relationship between the load (F) and the bending angle (θ) is obtained by sampling data successively and the point where the increment has a specified value is determined as a boundary point for the region expressed by a linear approximate expression.

Figure 11:
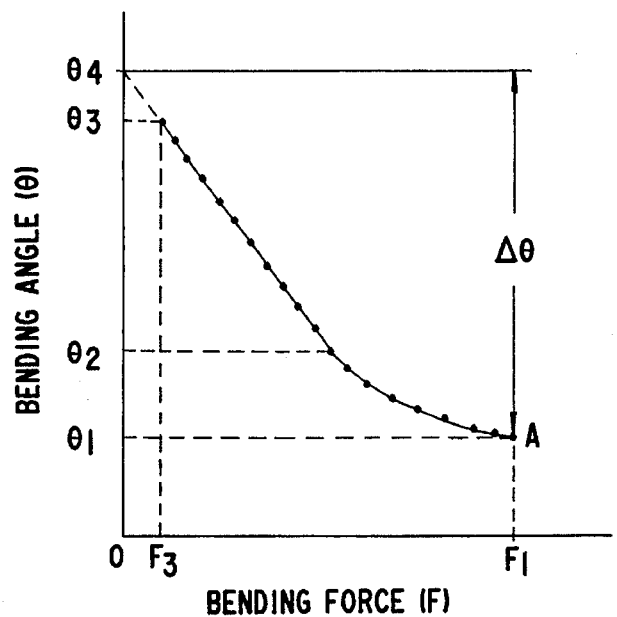
FIGS. 11 to 12 provides illustrations of a third embodiment of the springback angle measuring instrument of the invention.
Figure 13:
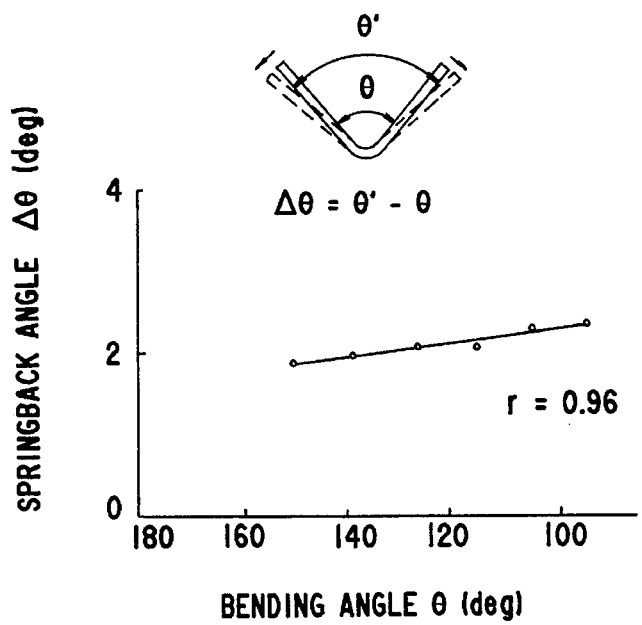
FIGS. 13 to 14 provides illustrations of one example of a prior art springback angle measuring instrument.

With reference to FIGS. 5 and 11, position control for an upper bender 12 and arithmetic operation for obtaining a springback angle will be described in accordance with the third embodiment.

First, the upper bender 12 is lowered to the unloading starting position A to bend a workpiece 13. The bending angle $\theta_1$ of the workpiece 13 at the unloading starting position A is detected by a bending angle detector 15. Then, the upper bender 12 is lifted at a very slow speed, and during the lifting of the upper bender 12, the bending angle of the workpiece 13 and the bending force imposed on the workpiece 13 are detected successively by a bending angle detector 15 and a bending force detector 16, respectively. From the sampled data thus obtained, the increment of the bending angle per unit amount of change in the bending force is calculated in an arithmetic and storage unit 17.

Then, at the point where the increments of the bending angle converge upon a certain value (second-order differential value=0), the bending angle $\theta_2$ of the workpiece 13 is detected by the bending angle detector 15.

Thereafter, the upper bender 12 is further lifted from the above point at a very slow speed until a preset bending force by which the workpiece 13 can be held is obtained (the bending force $F_3$ is sufficiently small but greater than 0). During the lifting of the upper bender 12, the bending angle of the workpiece 13 and the bending force imposed on the workpiece 13 are detected successively by the bending angle detector 15 and the bending force detector 16, respectively. At the time the bending force reaches a preset value, the bending angle $\theta_3$ of the workpiece 13 is detected by the bending angle detector 15.

Based on data on the bending angle and bending force sampled after the point where the increments of the bending force converge upon a certain value, the relationship between the bending angle and the bending force is expressed by a linear approximate expression. Then, the bending angle $\theta_4$ of the workpiece 13 with which the bending force is zero is estimated by the linear approximate expression. The difference $(\theta_4-\theta_1)$ between the bending angle $\theta_4$ thus obtained and the bending angle $\theta_1$ for the unloading starting position A is determined as the springback angle $\Delta\theta$.

Figure 12A:
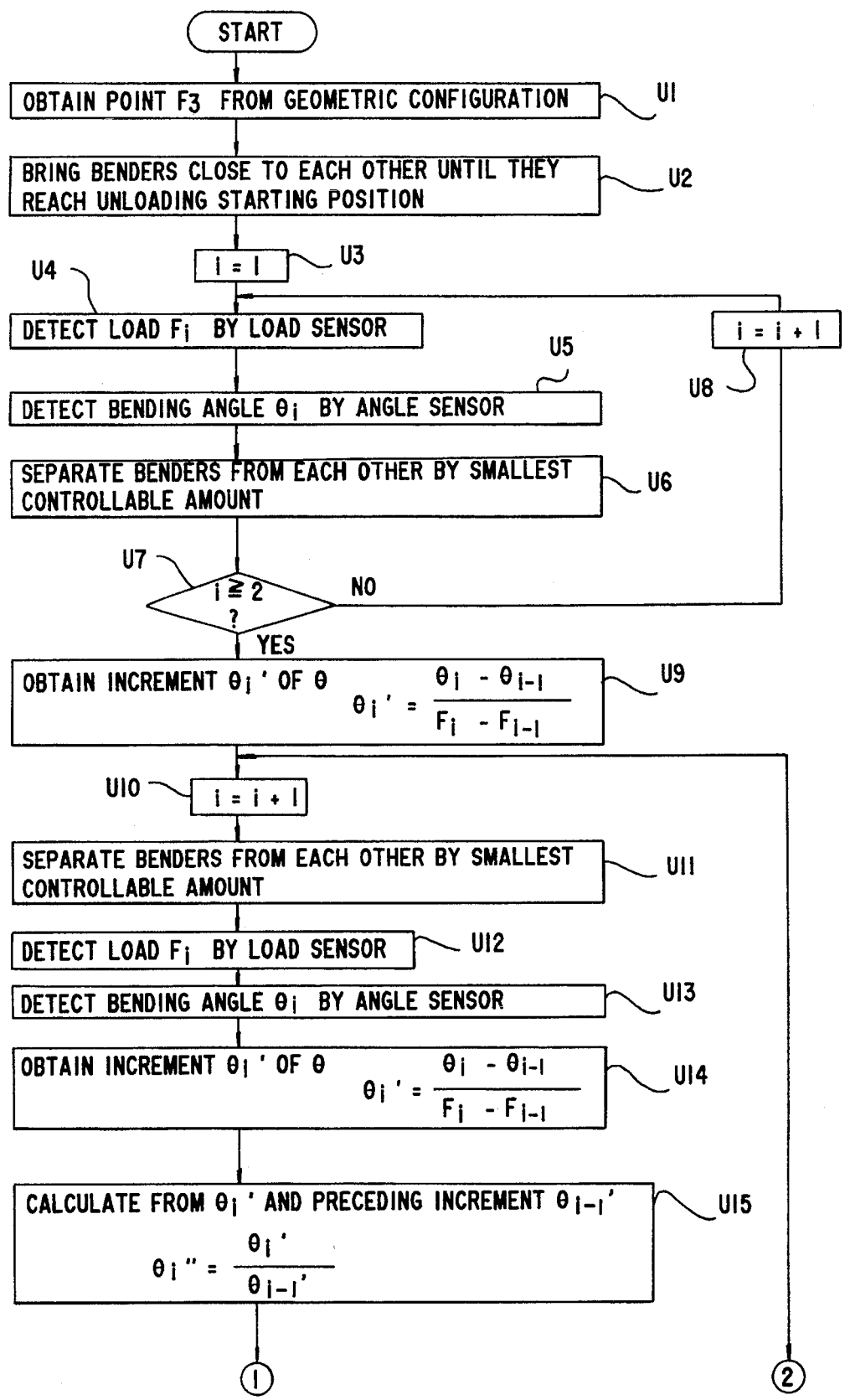
Figure 12:
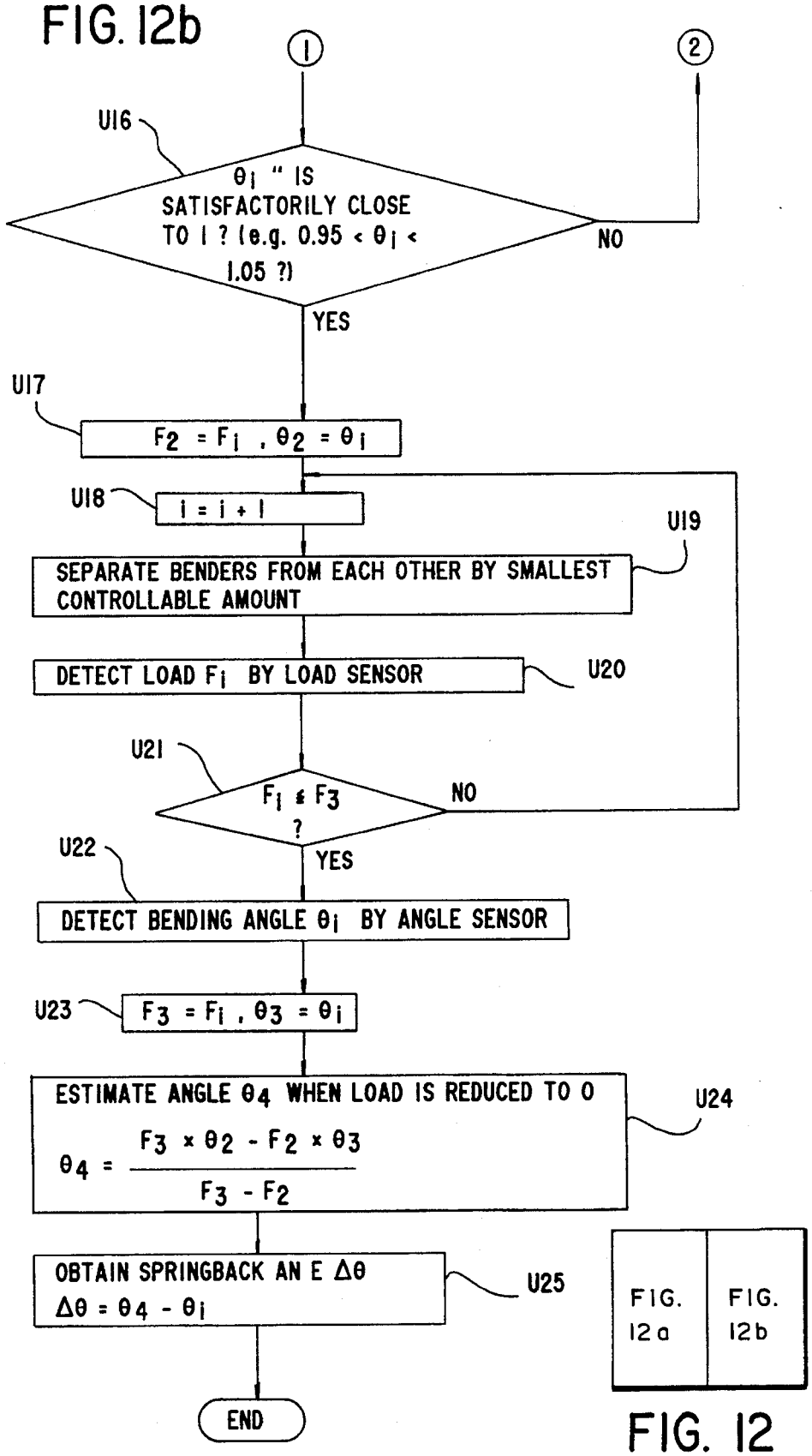
Figure 12:
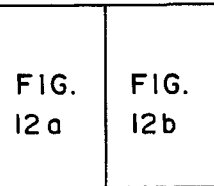
Figure 14C:
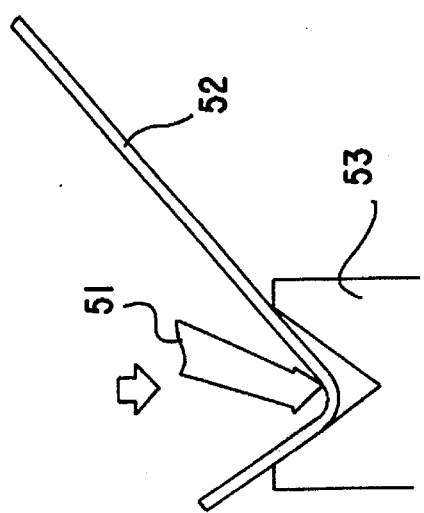
Figure 14B:
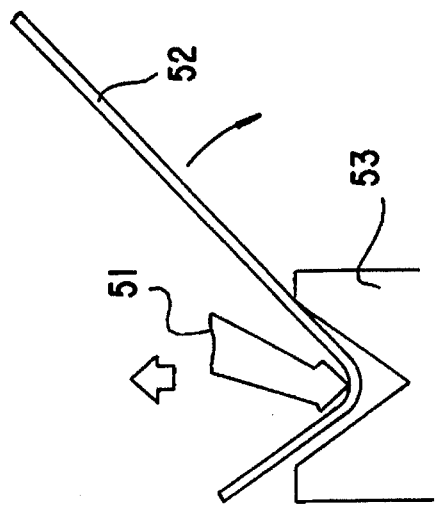
Figure 14A:
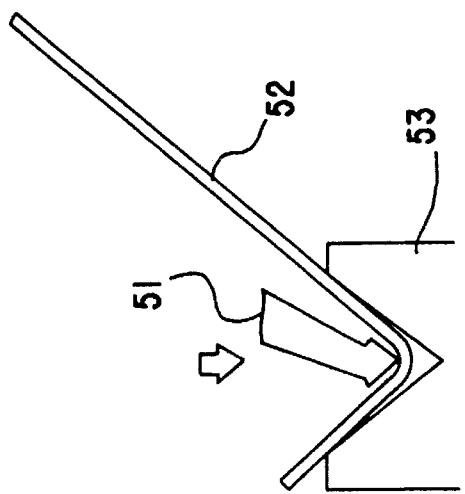

FIG. 12 shows the flow chart of the arithmetic operation for obtaining a springback angle according to the third embodiment. This flow chart will be described below.

U1 to U5: From the size and thickness of the workpiece 13 and the geometric configuration of the lower bender 11 (the size of the V-portion etc.), the point $F_3$ (set bending force) is obtained by arithmetic operation, and the lower bender 11 and the upper bender 12 are brought close to each other until they reach the unloading starting position. Then, an ordinal number i which indicates the number of sampled data pieces is set to 1. At the unloading starting position, the load (i.e., pressure) $F_i(=F_1)$ is detected by the load sensor (i.e., bending force detector 16) and the bending angle $\theta_i(=\theta_1)$ is detected by the angle sensor (i.e., bending angle detector 15).

U6 to U9: The lower bender 11 and the upper bender 12 are moved apart from each other by the smallest controllable amount. If the value of the ordinary number i is not 2 or more (i<2), the ordinary number i is incremented by 1 and the program returns to U4. If the ordinary number i is 2 or more (i≧2), the increment $\theta_i'$ of the bending angle θ per unit amount of change in the load F is calculated from the following equation.

$$\theta_i'=(\theta_i-\theta_{i-1})/(F_i-F_{i-1})$$

U10 to U17: The ordinary number i is incremented by 1 and the lower bender 11 and the upper bender 12 are moved apart from each other by the smallest controllable amount. During the separation, the load (pressure) $F_i$ is detected by the load sensor and the bending angle $\theta_i$ is detected by the angle sensor. By substituting these detected values in the following equation, the increment $\theta_i'$ of the bending angle θ per unit amount of change in the load F is calculated.

$$\theta_i'=(\theta_i-\theta_{i-1})/(F_i-F_{i-1})$$

Then, the ratio $\theta_i''$ of the present increment $\theta_i''$ to the preceding increment $\theta_{i-1}$ is calculated ($\theta_i''=\theta_i'/\theta_{i-1}'$). Then, judgment as to whether the ratio $\theta_i''$ is sufficiently proximate to 1(that is, whether the increment $\theta_i'$ converges upon a certain value) is carried out by judging whether $0.95<\theta_i''<1.05$ is satisfied. If the increment $\theta_i'$ converges upon a certain value, $F_2=F_i$ and $\theta_2=\theta_i$. If the increment $\theta_i'$ does not converge upon a certain value, the processes of U10 onwards are repeated.

U18 to U20: The ordinary number i is incremented by 1 and the lower bender 11 and the upper bender 12 are moved apart from each other by the smallest controllable amount. Then, the load $F_i$ is detected by the load sensor.

U21 to U25: If the detected load $F_i$ is more than $F_3(F_i>F_3)$, the program returns to U18. If the load $F_i$ is not more than $F_3(F_i\leq F_3)$, the bending angle $\theta_i$ is detected by the angle sensor and $F_3$ is set equal to $F_i$ and $\theta_3$ to $\theta_i$, respectively.

Then, the point $(\theta_2, F_2)$ and point $(\theta_3, F_3)$ on the bending angle (θ)-bending force (F) curve are expressed by a linear approximate expression and the bending angle $\theta_4$ when the load is reduced to zero is estimated by the following equation.

$$\theta_4=(F_3\times\theta_2-F_2\times\theta_3)/(F_3-F_2)$$

By substituting the bending angle $\theta_4$ thus obtained and the bending angle $\theta_1$ detected in Step U5 in the following equation, the springback angle Δθ is calculated.

$$\Delta\theta=\theta_4-\theta_1$$

According to the second embodiment or the third embodiment, the springback angle of a workpiece can be accurately detected without detecting the relative displacement of the upper and lower benders which are susceptible to the effects of the distortion of the benders and press and backlash etc.

In each of the foregoing embodiments, various contact type or non-contact type bending angle detectors may be employed as the bending angle detector 15. However, it is preferable to use a bending angle detector in which a slit light (or a plurality of spot lights) is projected onto the surface of the workpiece 13 and a linear projected image formed by the slit light is photographed by a photographing means to detect the bending angle of the workpiece 13 by image processing.

A load sensor attached to the ram driving section for lifting or lowering the upper bender 12 may be used as the bending force detector 16.

While the springback angle measuring instrument of each embodiment is applied to a bending machine of the overdrive type in which an upper bender is actuated, it is readily apparent that the instrument may be applied to a bending machine of the under-drive type in which an lower bender is actuated while an upper bender is fixed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Industrial Applicability

According to the invention, the springback angle of a workpiece can be detected at a stage where unloading for the workpiece has not been completed, so that rising of the workpiece from the die due to complete unloading can be avoided, resulting in a higher detection accuracy. This contributes to an improvement in the accuracy of the bender control.

We claim:

1. A springback angle measuring instrument for V-bending in which the springback angle of a workpiece, which is held between upper and lower benders to be bent into a V-shape by pressing with these benders, is measured as the amount of elastic recovery of the workpiece, the measuring instrument comprising:

(a) bender position detecting means for detecting the position of either the upper bender or lower bender being lifted or lowered during bending of the workpiece;

(b) bending angle detecting means for detecting the bending angle of the workpiece during bending of the workpiece;

(c) pressure detecting means for detecting a pressure imposed on the workpiece during bending of the workpiece; and (d) arithmetic and storage means for (i) storing a first bending angle of the workpiece, said first bending angle being detected by the bending angle detecting means when said bender is at an arbitrary position, (ii) obtaining the increment of the imposed pressure per unit lifting/lowering distance of said bender, based on the position of said bender and the value of the imposed pressure detected by the bender position detecting means and the pressure detecting means, respectively, while said bender is being lifted or lowered to reduce the pressure imposed on the workpiece within such a range that the pressure does not become zero, (iii) calculating the position of said bender at which the imposed pressure is zero from a linear approximate expression of at least two bending angles and two pressure values detected by the bending angle detecting means and the pressure detecting means, respectively, at two bender positions where said increment is kept to be a certain value, (iv) estimating a second bending angle of the workpiece for the bender position where the imposed pressure is zero, and (v) subtracting the first bending angle from the second bending angle to obtain the springback angle of the workpiece.

2. The springback angle measuring instrument for V-bending as claimed in claim 1, wherein the bender position detecting means is a position sensor attached to a bender driving section for lifting or lowering said bender.

3. The springback angle measuring instrument for V-bending as claimed in claim 1, wherein the bender position detecting means is a displacement sensor embedded in said bender.

4. A springback angle measuring instrument for V-bending in which the springback angle of a workpiece, which is held between upper and lower benders to be bent into a V-shape by pressing with these benders, is measured as the amount of elastic recovery of the workpiece, the measuring instrument comprising:

(a) bending angle detecting means for detecting the bending angle of the workpiece during bending of the workpiece;

(b) pressure detecting means for detecting a pressure imposed on the workpiece during bending of the workpiece; and (c) arithmetic and storage means for (i) storing a first bending angle of the workpiece and a first pressure, said first bending angle and said first pressure being detected by the bending angle detecting means and the pressure detecting means, respectively, when either the upper bender or lower bender is at an arbitrary position, (ii) storing a second bending angle of the workpiece, said second bending angle being detected by the bending angle detecting means when a second pressure is detected by the pressure detecting means as said bender is lifted or lowered to reduce the pressure imposed on the workpiece, the ratio of the second pressure to the first pressure being specified, (iii) storing a third bending angle of the workpiece and a third pressure, said third bending angle and said third pressure being detected by the bending angle detecting means and the pressure detecting means, respectively, at a position where the pressure imposed on the workpiece has a specified small value during lifting or lowering of said bender for reducing the imposed pressure to the specified small value, (iv) estimating a forth bending angle when the imposed pressure is zero from a linear approximate expression of the second and third bending angles and the second and third pressures, and (v) subtracting the first bending angle from the forth bending angle to obtain the springback angle of the workpiece.

5. The springback angle measuring instrument for V-bending as claimed in claim 4, wherein the forth bending angle is estimated from a linear approximate expression of three or more sampled data pieces on the bending angle and imposed pressure.

6. The springback angle measuring instrument for V-bending as claimed in claim 4, wherein the second pressure is half of the first pressure.

7. A springback angle measuring instrument for V-bending in which the springback angle of a workpiece, which is held between upper and lower benders to be bent into a V-shape by pressing with these benders, is measured as the amount of elastic recovery of the workpiece, the measuring instrument comprising:

(a) bending angle detecting means for detecting the bending angle of the workpiece during bending of the workpiece;

(b) pressure detecting means for detecting a pressure imposed on the workpiece, during bending of the workpiece; and (c) arithmetic and storage means for (i) storing a first bending angle of the workpiece and a first pressure, said first bending angle and said first pressure being detected by the bending angle detecting means and the pressure detecting means, respectively, when either the upper bender or lower bender is at an arbitrary position, (ii) obtaining the increment of the bending angle per unit amount of change in the imposed pressure, based on the bending angle of the workpiece and the imposed pressure which vary and are detected by the bending angle detecting means and the pressure detecting means, respectively, while said bender is being lifted or lowered to reduce the pressure imposed on the workpiece within such a range that the pressure does not become zero, (iii) estimating a second bending angle of the workpiece when the imposed pressure is zero from a linear approximate expression of at least two bending angles and two pressure values detected by the bending angle detecting means and the pressure detecting means, respectively, when the increment is kept to be a certain value, and (iv) subtracting the first bending angle from the second bending angle to obtain the springback angle of the workpiece.

8. The springback angle measuring instrument for V-bending as claimed in any one of claims 1 to 7, wherein the bending angle detecting means is designed such that a slit light or a plurality of spot lights projected onto the surface of the workpiece are photographed and the bending angle of the workpiece is detected by processing the photographed light image.

9. The springback angle measuring instrument for V-bending as claimed in any one of claims 1 to 7, wherein the pressure detecting means is a load sensor attached to the bender driving section for lifting or lowering said bender.

10. The springback angle measuring instrument for V-bending as claimed in any one of claims 1 to 7, which is applied to a bending machine of the over-drive type in which the lower bender is fixed while the upper bender is actuated.

11. The springback angle measuring instrument for V-bending as claimed in any one of claims 1 to 7, which is applied to a bending machine of the under-drive type in which the upper bender is fixed while the lower bender is actuated.

* * * * *

UNITED STATES PATENT AND TRADEMARK OFFICE
CERTIFICATE OF CORRECTION

PATENT NO. : 5,483,750
DATED : January 16, 1996
INVENTOR(S) : OOENOKI et al.

It is certified that error appears in the above-indentified patent and that said Letters Patent is hereby corrected as shown below:

Title page:

[22] delete "Filed: October 31, 1994" and insert therefor -- PCT Filed: May 26, 1994 --.

add -- [86] PCT No.: PCT/JP94/00840

§ 371 Date: October 31, 1994

§ 102(e) Date: October 31, 1994

[87] PCT Pub. No.: WO94/29044
PCT Pub. Date: Dec. 22, 1994 --.

Signed and Sealed this

Second Day of July, 1996

*Attest:*

*Attesting Officer*

BRUCE LEHMAN

*Commissioner of Patents and Trademarks*